(12) United States Patent
Shimizu et al.

(10) Patent No.: US 7,409,253 B2
(45) Date of Patent: Aug. 5, 2008

(54) SYSTEM AND METHOD FOR PROCESSING A SUBSTRATE AND PROGRAM THEREFOR

(75) Inventors: Noriaki Shimizu, Nirasaki (JP); Kimihiro Fukasawa, Nirasaki (JP); Kazuhiro Kanaya, Nirasaki (JP); Jun Shoji, Miyagi-gun (JP)

(73) Assignee: Tokyo Electron Limited, Tokyo (JP)

( * ) Notice: Subject to any disclaimer, the term of this patent is extended or adjusted under 35 U.S.C. 154(b) by 550 days.

(21) Appl. No.: 10/825,323

(22) Filed: Apr. 16, 2004

(65) Prior Publication Data
US 2006/0149403 A1 Jul. 6, 2006

(30) Foreign Application Priority Data

| Apr. 16, 2003 | (JP) | ............................. 2003-112109 |
| Apr. 17, 2003 | (JP) | ............................. 2003-113061 |
| Apr. 12, 2004 | (JP) | ............................. 2004-116918 |

(51) Int. Cl.
G06F 19/00 (2006.01)
G05B 11/01 (2006.01)
G05B 19/42 (2006.01)

(52) U.S. Cl. ............................. 700/96; 700/11; 700/23; 700/86; 700/121; 700/169; 700/181

(58) Field of Classification Search ............ 700/5, 700/9, 11, 19, 23–26, 86, 87, 95–97, 101, 700/121, 169, 181; 717/106–109, 136
See application file for complete search history.

(56) References Cited

U.S. PATENT DOCUMENTS

| 4,484,286 A | * | 11/1984 | Nagamine et al. ........... 700/181 |
| 4,757,459 A | * | 7/1988 | Lauchnor et al. ............ 700/264 |
| 4,914,599 A | * | 4/1990 | Seki et al. .................... 700/166 |
| 4,928,221 A | * | 5/1990 | Belkhiter ..................... 700/86 |
| 5,591,299 A | * | 1/1997 | Seaton et al. ................ 700/121 |
| 2002/0065572 A1 | | 5/2002 | Ina et al. |
| 2003/0182084 A1 | | 9/2003 | Tanaka et al. |

FOREIGN PATENT DOCUMENTS

| JP | 2002-43290 | 2/2002 |
| JP | 2002-163016 | 6/2002 |

\* cited by examiner

*Primary Examiner*—Sean P Shechtman
(74) *Attorney, Agent, or Firm*—Oblon, Spivak, McClelland, Maier & Neustadt, P.C.

(57) ABSTRACT

A substrate processing system allows to reduce the number of works that should be done by a software engineer. The system 100 includes a substrate processing apparatus 101; a substrate processing controller 102 for controlling the substrate processing apparatus 101; and a server 103 for storing therein commands, i.e., instructional statements, for defining an operation of each device. The substrate processing controller 102 has a RAM 105 serving as a work space for creating a macro file corresponding to each of processes divided from the whole substrate processing or for changing the content of a macro file; and an executor 108 composed of, e.g., CPU for executing a process sequence macro obtained by a combination of the created macro files. The user creates a macro file describing a sequential operation of each process or changes the content of a macro file by arranging the stored commands.

19 Claims, 11 Drawing Sheets

FIG. 3

```xml
<Command Name="HegasVacuumStart" Category="PREPROCESS-VACUUM" Target
        ="HeGas" Type="Device/>
<Command Name="HegasVacuumTime" Category="DELAY" Target="Interpreter" Type
        ="Delay">
    <Follow Name="HeGasVacuumStart"/>
    <Argument Name="Water backside pumping time before pressure control" Type
            ="chamberParameter"/>
</Command >

<Command Name="HegasVacuumEnd" Category="OFF" Target="HeGas" Type
        "Device">
    <Follow Name="HegasVacuumTime"/>
</Command >
<Command Name="ShutterOpen" Category="OPEN" Target="Shutter" Type="Device/">
<!--LLM-Arm-->
<Command Name="PinUp" Category="UP" Target="Pin" Type="Device">
    <Follow Name="ShutterOpen"/>
</Command >

<!--LLM-Arm-->
<Command Name="PinDown" Category="DOWN" Target="Pin" Type="Device"/>
    <Follow Name="PinUp"/>
</Command >

<Command Name="ShutterClose" Category="CLOSE" Target="Shutter" Type="Device">
    <Follow Name="PinUp"/>
</Command >
<Command Name="PressControlEnd" Category="FULL-OPEN" Target="APC" Type=
        "Device">
    <Follow Name="PinDown"/>
    <Follow Name="ShutterClose"/>
</Command >

<Command Name="N2GasVacuumStart" Category="N2-PURGE-OFF+VACUUM"
        Target="GasBox" Type="Device/>
    <Follow Name="PressControlEnd"/>
</Command >

<Command Name="N2GasVacuumTime" Category="DELAY" Target="Interpreter" Type
        ="Delay">
    <Follow Name="N2GasVacuumStart"/>
    <Argument Name="N2 purge line gas exchanging time" Type="ChamberParameter"/>
</Command >

<Command Name="N2GasVacuumEnd" Category="N2-VACUUM-END" Target=
        "GasBox" Type="Device">
    <Follow Name="N2GasVacuumTime"/>
</Command >

<Command Name="ESCControl" Category="ON" Target="ESC" Type="Device">
    <Follow Name="N2GasVacuumStart"/>
    <Argument Name="ESC Voltage"Type="RecipeItem"/>
</Command >

<Command Name="End" Category="END" Target="Interpreter" Type="End">
    <Follow Name="HeGasVacuumEnd"/>
    <Follow Name="N2GasVacuumEnd"/>
    <Follow Name="ESCControl"/>
</Command >
```

FIG.5

| ABSTRACT TABLE | CHECK ITEM | FACTOR LIST | ERROR CODE 1 | ERROR CODE 2 | ERROR CODE 3 | ERROR CODE 4 |
|---|---|---|---|---|---|---|
| NMS_ILT_BPC_OUT_VLV2 | BPC OUT VALVE (G82) OPEN INTERLOCK | | NMS_ILT_BPC_OUT_VLV2 | TXT_ERR_BPC | TXT_ERR_OT_VLV | TXT_ERR_OPEN |
| + | THE PRESENCE OF WAFER + ESC HV OFF, NMF_ILF_ESC_HV_OFF_WAHER | | | | | |
| + | THE PRESENCE OF WAFER + ESC VOLTAGE ZERO, NMS_ILF_ESC_VOLT_ZERO_WAHER | | | | | |
| END | | | | | | |

SYSTEM AND METHOD FOR PROCESSING A SUBSTRATE AND PROGRAM THEREFOR

FIELD OF THE INVENTION

The present invention relates to a system and method for performing a predetermined process on a substrate by controlling multiple component devices of a substrate processing apparatus, and a program to carry out the method.

BACKGROUND OF THE INVENTION

Conventionally, a magnetron parallel plate type substrate processing apparatus shown in FIG. 10 is known as a substrate processing apparatus for processing a semiconductor wafer W as a substrate.

This magnetron parallel plate type substrate processing apparatus 500 has a cylindrical processing-chamber vessel 501, which has an upper electrode 513 disposed at a top portion thereof and a cylindrical lower electrode 504 disposed at a lower portion thereof. For clamping a semiconductor wafer W, an ESC (electrostatic chuck) 502, which is surrounded by a focus ring 503 is mounted on the lower electrode 504. An isolation plate 507 is disposed adjacent to a top portion of the lower electrode 504 to separate the interior of the processing-chamber vessel 501 into a processing region 505 and a gas exhaust region 506. A gas exhaust port 508 is disposed at the lower portion of the processing-chamber vessel 501 to evacuate the processing region 505 under negative pressure through the gas exhaust region 506. Further, a loading/unloading opening 509 for the semiconductor wafer W is disposed on a wall facing the processing region 505.

Further, while the upper electrode 513 is grounded, the lower electrode 504 is connected to at least one high frequency power supply 511 via a matching circuit 510, and an annular permanent magnet 512 is disposed around an upper part of the processing-chamber vessel 501.

Regarding the substrate processing apparatus 500, the processing region 505, into which a processing gas is introduced through gas outlet holes disposed in the upper electrode 513, is controlled to a predetermined pressure level through negative pressure evacuation. Further, the high frequency power supply 511 excites a high frequency electric field in the processing region 505 located between the upper electrode 513 and the lower electrode 504 while the permanent magnet 512 generates a parallel magnetic field perpendicular to the high frequency electric field. A high density plasma is generated from the processing gas by the high frequency electric field and the parallel magnetic field perpendicular thereto, and the plasma performs a desired processing on the semiconductor wafer W.

In the substrate processing apparatus 500, maintenance of expendable parts such as the focus ring 503 is important; and in order to reduce the number of steps required for programming a maintenance program that conducts an operation test, which is one of the confirmation items during maintenance, a method that pre-registers the operation of components such as the focus ring 503, whereby each registered operation is combined at will to set up sequential and/or parallel operations thereof to write a maintenance macro file, has been known (e.g., see Patent Publication 1).

Meanwhile, in the substrate processing apparatus 500, a process executing unit (not shown), which has a CPU and other components that are installed in pertinent substrate the processing apparatus 500, executes a loading/unloading sequence of the semiconductor wafer W or an execution control sequence of a recipe, i.e., an individual processing program of the substrate processing apparatus, on control parameters (control target values of temperature, pressure, gas type and flow rate, time and the like) for the substrate processing (process) by way of operating various devices such as the above-described upper electrode 513 based on a program generated from compiled source codes that express sequences of various processes in a predetermined programming language. Recently, however, since a precise reproducibility is required in a process as etching patterns of a semiconductor wafer W are getting finer, parameter items need to be prescribed in further detail while an execution of a recipe appropriate for an individual substrate processing apparatus is necessary.

As a result, since recipes for a process should be customized to the substrate processing apparatus 500, although process experiments need to be conducted repeatedly with respect to the substrate processing apparatus 500, parameter items, however, are prescribed in the pertinent recipes in further detail as mentioned above, so that continual updating of the change in contents of the sequences including the executed recipes results from the increase of the kinds of recipes to be executed in the process experiments. Further, the changes in the content of the sequences refer to changes in the order of device operations, contents of the operations, waiting time, and the like.

Moreover, with respect to a source code, in addition to the execution control sequence of recipes as previously mentioned, a sequence of an interlock process about the operation of the substrate processing apparatus 500 and a sequence of a recovery process related to the interlock process are described.

By the sequences of the interlock and the recovery process, the operation of each device of the substrate processing apparatus 500 is controlled based on a predetermined condition when the sequence of the loading/unloading of a semiconductor wafer W or the execution control sequence of the recipe is executed; and, further, for example, an alarm is activated to warn the user when the operation of each device based on the predetermined condition is controlled. In addition, accompanying the frequent changes in the contents of sequences including the recipes recently executed, content changes of the sequence of an interlock and recovery process concerning the interlock are frequently made as well.

Further, the substrate processing apparatus such as a magnetron parallel plate type substrate processing apparatus is usually placed in a clean room in order to prevent contaminants from sticking to a semiconductor wafer W. The substrate processing apparatus has an operation panel, which displays a list made of multiple operation items. Further, the user needs to go to the clean room, when controlling the substrate processing apparatus, in order to select a desired operation item from the list on the operation panel for operating the apparatus. Therefore, the user can operate the substrate processing apparatus while watching it on the spot.

However, since cases exist where the user need not observe firsthand the substrate processing apparatus depending on the content of operations, for example, releasing a stoppage caused by a minor trouble. It is undesirable for the user to go to the clean room for such a type of operation from the perspective of an operation efficiency. Therefore, a substrate processing system capable of remote-controlling the substrate processing apparatus from a remote location such as an office, without a need for the user to be present in the clean room, has been proposed (hereinafter referred to as a "remote control system").

As such a remote control system, a substrate processing system including a substrate processing apparatus and a remote terminal provided at a place away from the substrate processing apparatus is well known in the art. The remote terminal has a display device and software for displaying contents similar to those displayed by the operation panel on the display device. Specifically, an industrial apparatus management system, as shown in FIG. 11, which includes a factory 700, a vendor 800 located at a place remote from the factory 700 and a data communication network 900 for connecting the factory 700 and the vendor 800 is known in the art (for example, Patent Publication 2).

With respect to the management system, the factory 700 has an industrial apparatus 710, a management apparatus 720 for managing the industrial apparatus, and a factory-side controller 730 for controlling the industrial apparatus 710 through the management apparatus 720 while the vendor 800 has a vendor-side controller 810.

The management apparatus 720 has a management program 722 for controlling the management system; the factory-side controller 730 has a control program for controlling the controller's operation; and the vendor-side controller 810 has a control program 813 for controlling the operation thereof.

The management program 722 assigns an authority for the operation of the industrial apparatus 710 to either the factory-side controller 730 or the vendor-side controller 810. When the authority is assigned to the vendor-side controller 810, the vendor-side controller 810 can remotely control the industrial apparatus 710 through the management apparatus 720. Accordingly, the vendor 800 can optimize parameters of the industrial apparatus 710, and resolve troubling symptoms thereof.

As described above, in the conventional remote control systems, each of the substrate processing apparatus and the remote terminal has operation control software for controlling the operation of the corresponding apparatus, and the remote control of the substrate processing apparatus is achieved through communications among the softwares.

[Patent Publication 1] Japanese Patent Laid-Open Publication No. 2002-43290 (FIG. 3)

[Patent Publication 2] Japanese Patent Laid-Open Publication No. 2002-163016 (FIG. 1)

However, in the invention disclosed in Patent Publication 1, it is required to rewrite source codes every time the content of the sequence is changed, which is difficult for a person other than a software engineer to carry out. Further, after rewriting the source codes, executable software needs to be created in order to execute the sequence, by linking programs that are generated by compiling the source codes. Accordingly, a problem exists such that frequent changes of the sequence contents require increased number of works by the software engineer. Further, such changes in the contents the sequence accompany content changes in the sequence of the interlock and the recovery process, which may extensively affect parts other than the element subjected to the change, so that the number of the works of the software engineer is further increased. As a result, the number of processes required for the creation of a program concerning sequences needs to be reduced as in the case of the maintenance program described before.

Further, since there exist two different kinds of operation control software in the remote control system of Patent Publication 2, the number of processes demanded for the creation of the software is considerably large. Moreover, if software of one side is upgraded, the other ones should also be upgraded, thereby creating the problem of expanding the number of processes for managing the software.

SUMMARY OF THE INVENTION

It is, therefore, an object of the present invention to provide a system and method capable of reducing the extensive works performed by a software engineer; and a program for performing the method.

In accordance with one aspect of the invention, there is provided a substrate processing system for performing a processing including a plurality of processes on a substrate by operating a multiplicity of devices incorporated in a substrate processing apparatus, the system including: a storage unit for storing therein commands describing predetermined operations of the devices; a generation unit for generating macro files from the stored commands and creating a process sequence macro by combining the generated macro files, each of the macro files corresponding to each of the plurality of processes; and an execution unit for executing the process sequence macro.

According to this aspect of the invention, it becomes possible for the user to change the content of a sequence by changing the content of macro files through the use of stored commands without a need to rewrite source codes. As a result, the extensive number of works demanded from a software engineer can be reduced. Moreover, frequent changes of contents of a process sequence can be made without requiring a great number of works from the software engineer as well.

Further, it is preferable that the generation unit includes a user interface.

According to this embodiment, the user can change the content of the macro files readily because a generation unit includes a user interface. Further, it is preferable that the commands are converted into hard codes.

According to this embodiment, compiling and linking works become unnecessary in executing the process sequence macro obtained by combining the macro files. Thus, the number of works of the user can be greatly reduced.

Further, it is preferable that the substrate processing system includes another storage unit for storing the generated macro files.

According to this embodiment, the user can recycle already generated macro files when changing the content of the sequence because the generated macro files are stored. Therefore, the number of works of the user can more definitely be reduced.

Further, it is preferable that said another storage unit is identical to the storage unit.

According to this embodiment, the configuration of the substrate processing apparatus can be simplified because a storage unit and the other storage unit are identical.

Further, it is preferable that the substrate processing system includes a communication unit for sending the macro files to an external device and receiving the macro files from the external device.

According to this embodiment, the user can carry out a creation of a macro file or change in the content of a macro file by using the external device, so that the convenience on behalf of the user can be enhanced.

Further, it is preferable that the substrate processing system includes a verification unit for examining whether the sequence of each of the macro files is normal.

According to this embodiment, occurrences of process error can be prevented in advance when executing the process sequence macro containing the specific macro file, thereby accompanying an improvement of work efficiency.

Further, it is preferable that the storage unit further stores therein a data file defining a control of a predetermined operation of each of the devices corresponding to the macro files; the generation unit generates the data file; and the execution unit executes the control of the predetermined operation of each of the devices based on the generated data file.

According to this embodiment, the user can change the content of the control of the predetermined operation of the particular device through the use of the data file without rewriting source codes.

Further, it is preferable that the storage unit incorporates still another storage unit for storing the data file defining the control of the predetermined operation of each of the devices corresponding to the macro files.

Further, it is preferable that the data file also defines an alarming operation for reporting the completion of the control of the predetermined operation of each of the devices; and a control of another device related to the predetermined operation of each of the devices.

According to this embodiment, the user can change the content of an alarm warning corresponding to the control of a predetermined operation of a certain device and the content of the control of another device corresponding to the predetermined operation of the certain device through the use of the data file without rewriting source codes.

In accordance with another aspect of the invention, there is provided a substrate processing method for performing a processing including a plurality of processes on a substrate by operating a multiplicity of devices incorporated in a substrate processing apparatus, the method including the steps of: storing commands defining predetermined operations of the devices; generating macro files from the stored commands and creating a process sequence macro by combining the generated macro files, each of the macro files corresponding to each of the plurality of processes; and executing the process sequence macro.

According to this aspect of the invention, it becomes possible for the user to change the content of a sequence by changing the content of macro files through the use of stored commands without a need to rewrite source codes. As a result, the extensive number of works demanded from a software engineer can be reduced. Moreover, frequent changes of contents of a process sequence can be made without requiring a great number of works from the software engineer as well.

Further, it is preferable that the storage step further stores a data file defining a control of a predetermined operation of each of the devices corresponding to the macro files; the generation step generates the data file; and the execution step executes the control of the predetermined operation of each of the devices based on the generated data file.

According to this embodiment, the user can change the content of the control of the predetermined operation of the particular device through the use of the data file without rewriting source codes.

Further, it is preferable that the storage step further includes another storage step for storing the data file defining the control of the predetermined operation of each of the devices corresponding to the macro files.

Further, it is preferable that the data file also defines an alarming operation for reporting the completion of the control of the predetermined operation of each of the devices; and a control of another device related to the predetermined operation of each of the devices.

According to this embodiment, the user can change the content of an alarm warning corresponding to the control of a predetermined operation of a certain device and the content of the control of another device corresponding to the predetermined operation of the certain device through the use of the data file without rewriting source codes.

In accordance with still another aspect of the invention, there is provided a program for executing a substrate processing method for performing a processing including a plurality of processes on a substrate by operating a multiplicity of devices incorporated in a substrate processing apparatus, wherein the program's operations executed on a computer includes: a storage module for storing therein commands describing predetermined operations of the devices; a generation module for generating macro files form the stored commands and creating a process sequence macro by combining the generated macro files, each of the macro files corresponding to each of the plurality of processes; and an execution module for executing the process sequence macro.

According to this aspect of the invention, it becomes possible for the user to change the content of a sequence by changing the content of macro files through the use of stored commands without a need to rewrite source codes. As a result, the extensive number of works demanded from a software engineer can be reduced. Moreover, frequent changes of contents of a process sequence can be made without requiring a great number of works from the software engineer as well.

Further, it is preferable that the commands are converted into hard codes.

According to this embodiment, compiling and linking works become unnecessary in executing the process sequence macro obtained by combining the macro files. Thus, the number of works of the user can be greatly reduced.

Further, it is preferable that the program also operates another storage module for storing the generated macro files on the computer.

According to this embodiment, the user can recycle already generated macro files when changing the content of the sequence because the generated macro files are stored.

Therefore, the number of works of the user can more definitely be reduced. Further, it is preferable that the program further operates a transmission module for sending the macro files to an external device and a reception module for receiving the macro files from the external device on the computer.

According to this embodiment, the user can carry out a creation of a macro file or change in the content of a macro file by using the external device, so that the convenience on behalf of the user can be enhanced.

Further, it is preferable that the program further operates a verification module for examining whether a sequence of each of the macro files is normal.

According to this embodiment, occurrences of process error can be prevented in advance when executing the process sequence macro containing the specific macro file, thereby accompanying an improvement of work efficiency.

Further, it is preferable that the storage module further stores a data file defining a control of a predetermined operation of each of the devices corresponding to the macro files; the generation module generates the data file; and the execution module executes the control of the predetermined operation of each of the devices based on the generated data file.

According to this embodiment, the user can change the content of the control of the predetermined operation of the particular device through the use of the data file without rewriting source codes.

Further, it is preferable that the storage module incorporates still another storage unit for storing the data file defining the control of the predetermined operation of each of the devices corresponding to the macro files.

Further, it is preferable that the data file also defines an alarming operation for reporting the completion of the control of the predetermined operation of each of the devices; and a control of another device related to the predetermined operation of each of the devices.

According to this embodiment, the user can change the content of an alarm warning corresponding to the control of a predetermined operation of a certain device and the content of the control of another device corresponding to the predetermined operation of the certain device through the use of the data file without rewriting source codes.

In accordance with still another aspect of the invention, there is provided a program for performing a substrate processing method for conducting a predetermined processing on a substrate by using a substrate processing system including a substrate processing apparatus; a controller equipped with an operation input unit through which an operation of a user is inputted to control an operation of the substrate processing apparatus; and a remote terminal isolated from the substrate processing apparatus and equipped with another operation input unit through which an operation of a user is inputted, wherein the program's operations executed on a computer includes: an operation control module for controlling an operation of the operation input unit; and another operation control module for controlling an operation of said another operation unit.

According to this aspect of the invention, the number of works that should be performed by a software engineer can be reduced and, further, the number of processes for creating and managing software for use in controlling the substrate processing apparatus and a remote terminal can be reduced.

Further, it is preferable that the operation control module includes an input restriction unit for restricting an input of an operation from either one of the operation input unit and said another operation input unit.

According to this embodiment, duplicative operation inputs from the operation input unit and another operation input unit can be avoided, thereby enabling a smooth control of the substrate processing apparatus.

Further, it is preferable that the operation control module includes an input source determination unit for determining an input source of an operation of the user when the operation is inputted.

According to this embodiment, an input of an operation requiring a user's firsthand operation of the substrate processing apparatus from another input operation unit, the safety of substrate processing of the substrate processing system can be improved.

In accordance with still another aspect of the invention, there is provided a program for performing a substrate processing method for conducting a predetermined processing on a substrate by using a substrate processing system including a substrate processing apparatus; a controller equipped with an operation input unit through which an operation of a user is inputted to control an operation of the substrate processing apparatus; and a remote terminal isolated from the substrate processing apparatus and equipped with another operation input unit through which an operation of a user is inputted, wherein the program's operations executed on a computer includes: a display module for displaying operation items that can be inputted to the operation input unit; and a remote input module for displaying the operation items on said another operation input unit and recognizing an input to said another operation input unit as an input to the operation input unit.

According to this embodiment, the software for controlling the operation of a remote terminal can be eliminated, thereby reducing the number of processes for creating and maintaining software for use in controlling the operations of the substrate processing apparatus and the remote terminal.

BRIEF DESCRIPTION OF THE DRAWINGS

FIG. 3 shows a part of a process sequence macro in the substrate processing system of FIG. 1;

FIG. 5 schematically shows an exemplary data file stored in a server of FIG. 1;

Figure 1:
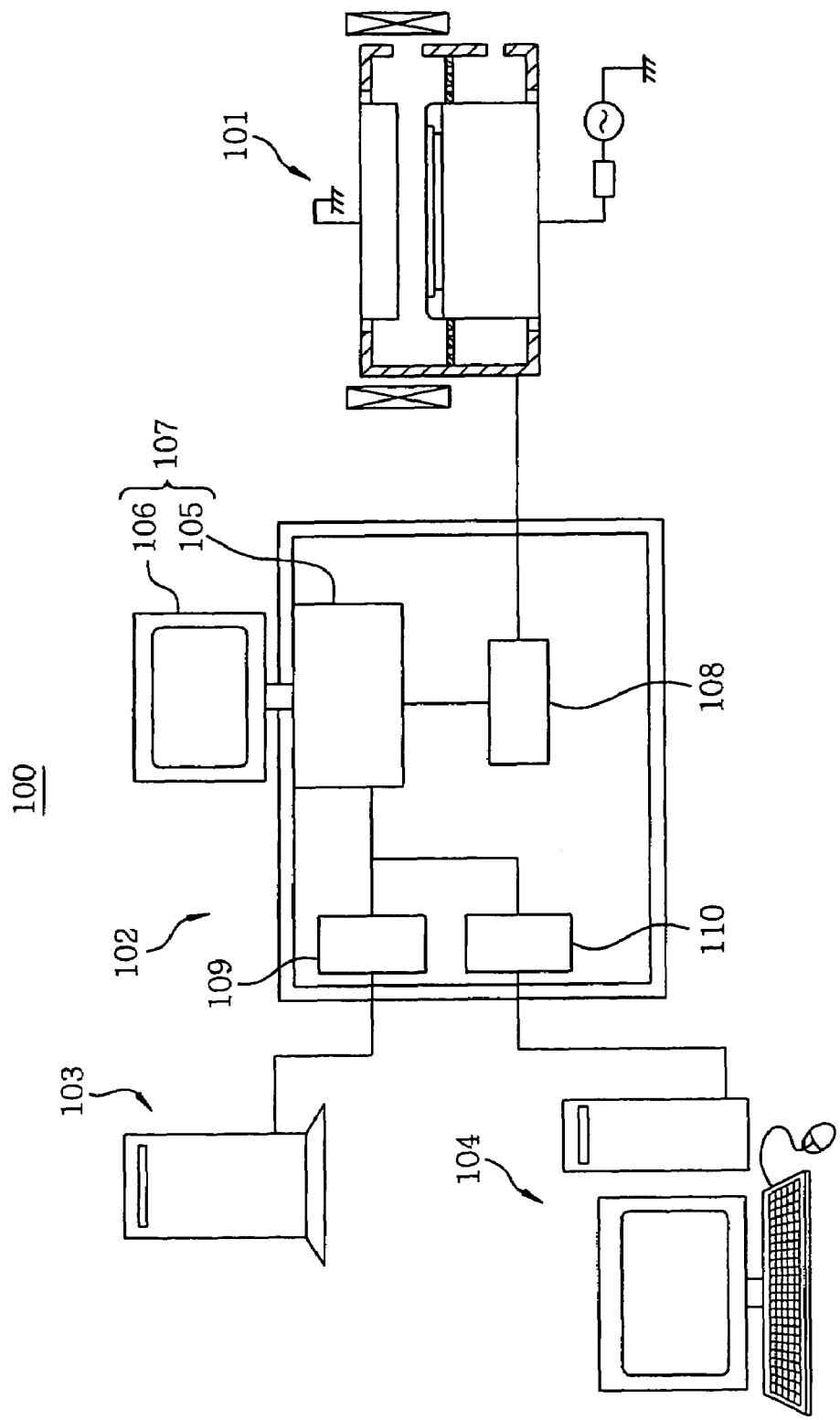
FIG. 1 shows a schematic diagram of a substrate processing system in accordance with a first embodiment of the present invention.

EXPLANATION OF REFERENCE 100 substrate processing system
101 substrate processing apparatus
102 substrate processing controller
103 server
104 PC
106 user interface
107 macro file editor unit
108 executor
109 server communication unit
110 PC communication unit

DETAILED DESCRIPTION OF PREFERRED EMBODIMENTS

Substrate processing systems in accordance with embodiments of the present invention will now be described in detail.

Referring to FIG. 1, there is provided a schematic diagram of a substrate processing system in accordance with a first embodiment of the present invention.

In FIG. 1, the substrate processing system 100 includes a substrate processing apparatus 101 having a configuration identical to that of a conventional magnetron parallel plate type substrate processing apparatus; a substrate processing controller 102 for controlling the substrate processing apparatus 101; and a server (storage unit) 103 for storing therein commands to be described later and data files related to interlocks of the substrate processing apparatus 101; a personal computer (hereinafter refer to as a "PC") 104 (an external apparatus) equipped with an input device such as a keyboard and a mouse, wherein the substrate processing controller 102 is connected to each of the substrate processing apparatus 101, the server 103 and the PC 104 via a wired or wireless network.

The substrate processing controller 102 includes a macro file editor unit 107 (generation unit), which has a RAM 105 serving as a working area for creating macro files to be described later from the commands stored in the server 103, or for editing data files stored in the server 103, and a user interface 106 such as a monitor having a touch panel sensor function; an executor 108 (execution unit) which has a CPU and the like for executing a process sequence macro, to be described later, generated by the combination of the macro files created by the macro file editor unit 107, and for executing the data files; a server communication unit 109 for performing data communications with the server 103 through a TCP/IP or the like; and a PC communication unit 110 for performing data communications through the use of a TCP/IP or the like in the same manner. Further, since the configuration of the substrate processing apparatus 101 is identical to that of the substrate processing apparatus 500, a detailed explanation thereof will be omitted.

Next, commands stored in the server 103, macro files created from the commands and a process sequence macro obtained by a combination of the macro files will be described.

Generally, an etching process of a semiconductor wafer W in a substrate processing apparatus can be divided (profiled) into multiple processes.

Figure 2:
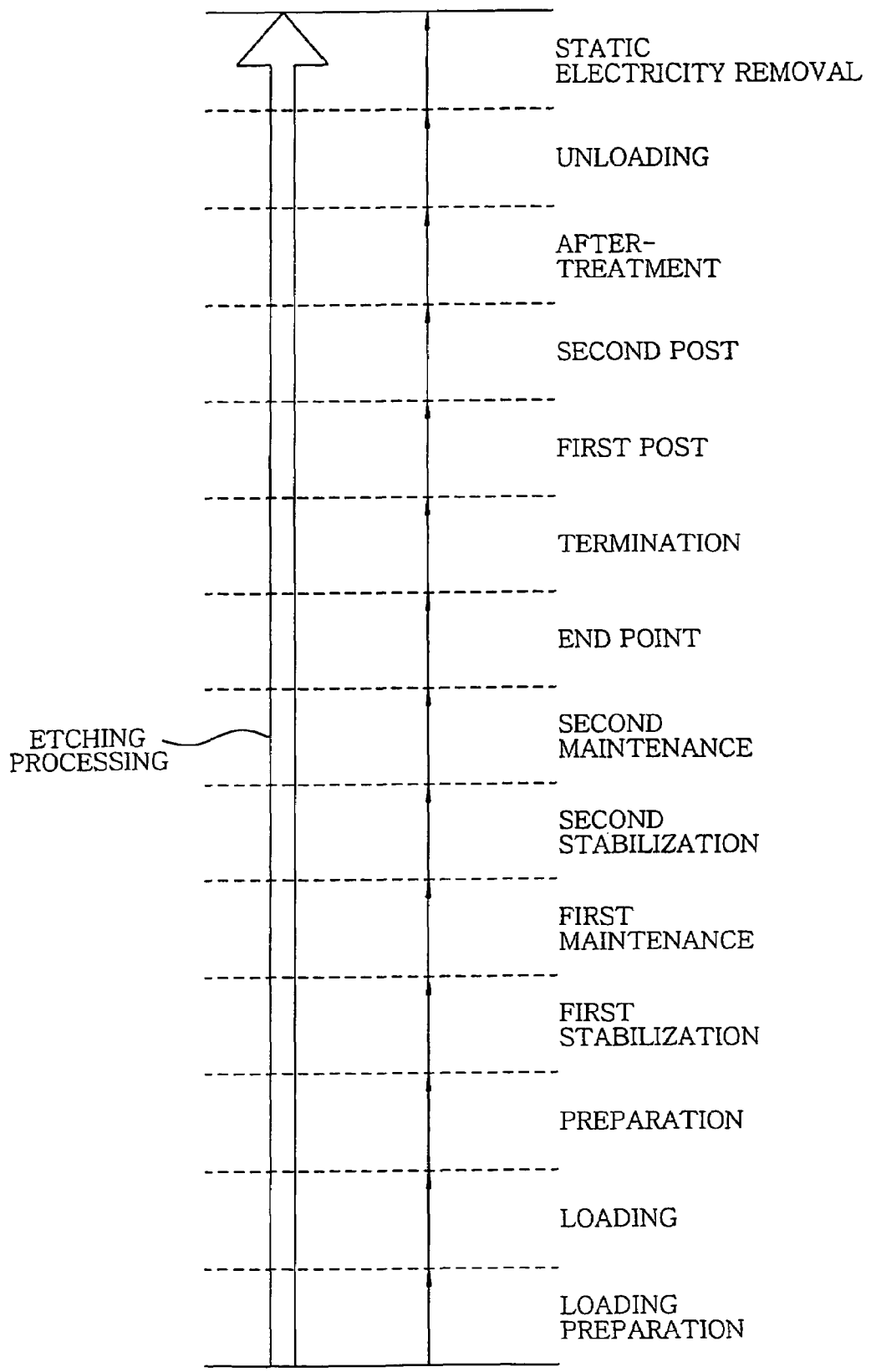
FIG. 2 shows an example of dividing the substrate etching process with respect to the substrate processing system as shown in FIG. 1 into multiple sub-processes.

FIG. 2 describes an example of dividing the substrate etching process with respect to the substrate processing apparatus shown in FIG. 1 into multiple processes.

In FIG. 2, the etching process of a semiconductor wafer W is divided into 14 processes including, in the order of performance, a loading preparation process, a loading process, a preparation process, a first stabilization process, a first maintenance process, a second stabilization process, a second maintenance process, an end point process, a termination process, a first post process, a second post process, an after-treatment process, an unloading process and a static electricity removal process.

The loading preparation process is a process for performing a processing between a preparation startup and a start of loading the semiconductor wafer W; the loading process is a process for loading the semiconductor wafer W into the substrate processing apparatus through the loading/unloading opening to mount it on an ESC; the preparation process is a process for performing a processing between the point when the semiconductor wafer W is mounted on the ESC and the point when a recipe corresponding to a desired etching processing is started. The first stabilization process is a process for stabilizing a temperature, a pressure, a gas flow rate and the like so that they are within the ranges, which allow for etching processing to be carried out in the substrate processing apparatus; the first maintenance process is a process for performing the etching processing on the semiconductor wafer W by maintaining the pressure, the temperature and the gas flow rate within the stabilized substrate processing apparatus. With respect to the second stabilization process, if multiple etching processes are performed, it prepares the second maintenance process and stabilizes a temperature, a pressure, a gas flow rate and the like so that they are within the ranges, which allow for etching processing to be carried out in the substrate processing apparatus; and the second maintenance process, if multiple etching processes are performed, is a process for performing the etching processing on the semiconductor wafer W by maintaining the temperature, the pressure, the gas flow rate and the like within the stabilized substrate processing apparatus. The end point process refers to a process for detecting the end point of the etching processing on the semiconductor wafer W while the termination process is a process for terminating the execution of the recipe. The first post process is a process for evacuating a backside of the semiconductor wafer W in a vacuum while the second post process is a process to change the ESC to an off condition to turn off an electrostatic chuck of the semiconductor wafer W. The after-treatment process is a process for performing a processing after the turning off of the electrostatic chuck until the semiconductor wafer W is unloaded from the substrate processing apparatus. The unloading process refers to a process for unloading the semiconductor wafer W from the substrate processing apparatus while the static electricity removal process represents a process for performing a processing from the start of the static electricity removal of the ESC until the completion of the etching processing.

With respect to macro files, one macro file is set up for each of the 13 processes except for the termination process. Each macro file specifies sequential operations of each process, and the content thereof is not written in source code but is concisely described by using commands as will be described later. In this regard, a macro file refers to a text file in which commands to be executed are listed, and is employed in general for the automation of a display process of a simple data structure.

Further, a command is an instructional statement defining an operation of each device. For example, a command is an operation portion of a corresponding device in source codes of sequential operations converted into hard codes, and is a portion taken out of the source codes of the sequential operations. For instance, a in a form of source codes form corresponding to the operation of turning on the electrostatic chuck (ESC) or the operation of turning on a supply of a high frequency current to the lower electrode while for each device, a predetermined operation is defined as a command.

In addition, corresponding to the loading preparation process, a Pre-Wafer (PW) macro file is set up, and for the loading process, a loading (TI) macro file is set up. Further, corresponding to the preparation process, a Pre-Process (PR) macro file is set up, and corresponding to the first stabilization process, the first maintenance process, the second stabilization process, the second maintenance process and the end point process, step (SP1 to SP5) macro files are set up, respectively. Further, corresponding to the first post process, a wafer vacuum evacuation (T1) macro file is set up, and corresponding to the second post process, a chuck OFF (T2) macro file is set up. Moreover, corresponding to the after-treatment process, an after-treatment (PO) macro file is set up, and corresponding to the unloading process and the static electricity removal process, an unloading macro (TO) file, and an After-Wafer-Process (AP) macro file are set up, respectively.

FIG. 3 illustrates a part of a process sequence macro for use in the substrate processing system shown in FIG. 1.

As shown in FIG. 3, multiple commands expressed in the form of, e.g., [<Command Name = "A" Category = "B" Target = "C" Type = "D"/>] are arranged in the TI macro file which is a part of the process sequence macro. In this command example, [Name] defines the name of a command; [Target] designates a device to be controlled; [Category] specifies the operation of a device designated by [Target]; and [Type] defines properties of the content of processing to be performed by the corresponding command. For example, [<Command Name = "HeGasVacuumStart" Category = "PREPROCESSVACUUM" Target = "HeGas" Target = "Device"/>] is a command for performing an operation named [HeGasVacuumStart], wherein the operation draws in He gas serving as a processing gas from the inside of a substrate processing apparatus.

A subordinate command [<Follow Name = "E">/] designates an execution timing of a dominant command. For example, [<Follow Name = "HeGasVacuumStart">] indicates an execution of a dominant command after the completion of the command named [HeGasVacuumStart].

Further, another subordinate command [<Argument Name = "F" Type = "G">/] sets a parameter of an operation content of a device designated by the dominant command. For instance, [<Argument Name = "Wafer backside pumping time before pressure control" Type = "ChamberParameter">/] indicates that the name of a parameter is identified as [Wafer backside pumping time before pressure control] and the content thereof is set by using [ChamberParameter]. Here, a recipe can also be set up in addition to the parameter.

Further, the TI macro file in FIG. 3 regulates a sequential operation of the loading process by using multiple commands. Accordingly, by modifying commands in the macro file, changes in sequential operations can be easily made.

Further, as described above, since a macro file is set up for each of the processes divided from the etching processing of the semiconductor wafer W, the etching processing of the semiconductor wafer W can be carried out by performing a block of macro files (macro) combined in the order of PW macro file, TI macro file, PR macro file, Step macro files, T1 macro file, T2 macro file, PO macro file, TO macro file and AP macro file. At this time, the combined macro becomes a process sequence macro.

Referring back to FIG. 1, in the substrate processing system 100, the server 103 stores therein multiple commands in advance, and the server communication unit 109 sends commands designated by a user from the server 103 to the RAM 105 when creating a macro file or changing the content of a macro file. Further, in the RAM 105 of the macro file editor unit 107, a macro file in which multiple commands are arranged is generated for each step of the etching process of the semiconductor wafer W in accordance with the user's instruction inputted via the user interface 106.

Further, with respect to the RAM 105, macro files containing multiple commands are generated and the generated macro files are also integrated so that a process sequence macro as an upper-level macro file is generated. The process sequence macro corresponds to a list of operation menus displayed on touch panels 621 and 631, which will be described later with reference to FIG. 6, via the user interface 106, and is executed when the user selects an operation menu on the touch panels by selecting it with fingers. By hierarchizing macro files as described, a single stable interface can be provided, and, further, the interface allows operators to access various properties of lower-layer command. Further, by integrating multiple macro files, the overall size of macro files become smaller while batch-processing of multiple macro files representing different sequential operations is enabled.

The executor 108 executes the created process sequence macro to control the operation of each device of the substrate processing apparatus 101, thereby performing the etching process on the semiconductor wafer W. Further, the process sequence macro can be stored in the server 103 or the like.

The user interface 106 displays on its monitor multiple selectable processes of the etching processing, and, if a certain process is chosen, it shows selectable commands available for carrying out the selected process or existing macro files, that are already stored in the server 103, corresponding to the selected process. In addition, the user creates a macro file by selecting displayed processes and commands, or selects an existing macro file to change its content, thereby changing the content of the sequential operation.

After a macro file is generated or the content of a macro file is changed in the RAM 105, the server communication unit 109 sends a corresponding macro file to the server 103. Further, when creating a macro file or changing the content of a macro file, the server communication unit 109 also transmits the macro file stored in the server 105 to the RAM 105.

Further, the PC communication unit 110, when creating a macro file or changing the content of a macro file, sends commands or macro files present in the RAM 105 to the PC 104, and also transmits macro files existing in the PC 104 to the RAM 105.

Further, the executor (verification unit) 108, when a macro file is sent to the RAM 105 by the server communication unit 109 or the PC communication unit 110, or when a macro file is created or the content of a macro file is changed in the RAM 105, examines whether or not the corresponding macro file is executable by the executor 108.

Hereinafter, a processing of a substrate by using the substrate processing apparatus shown in FIG. 1 is explained.

Figure 4:
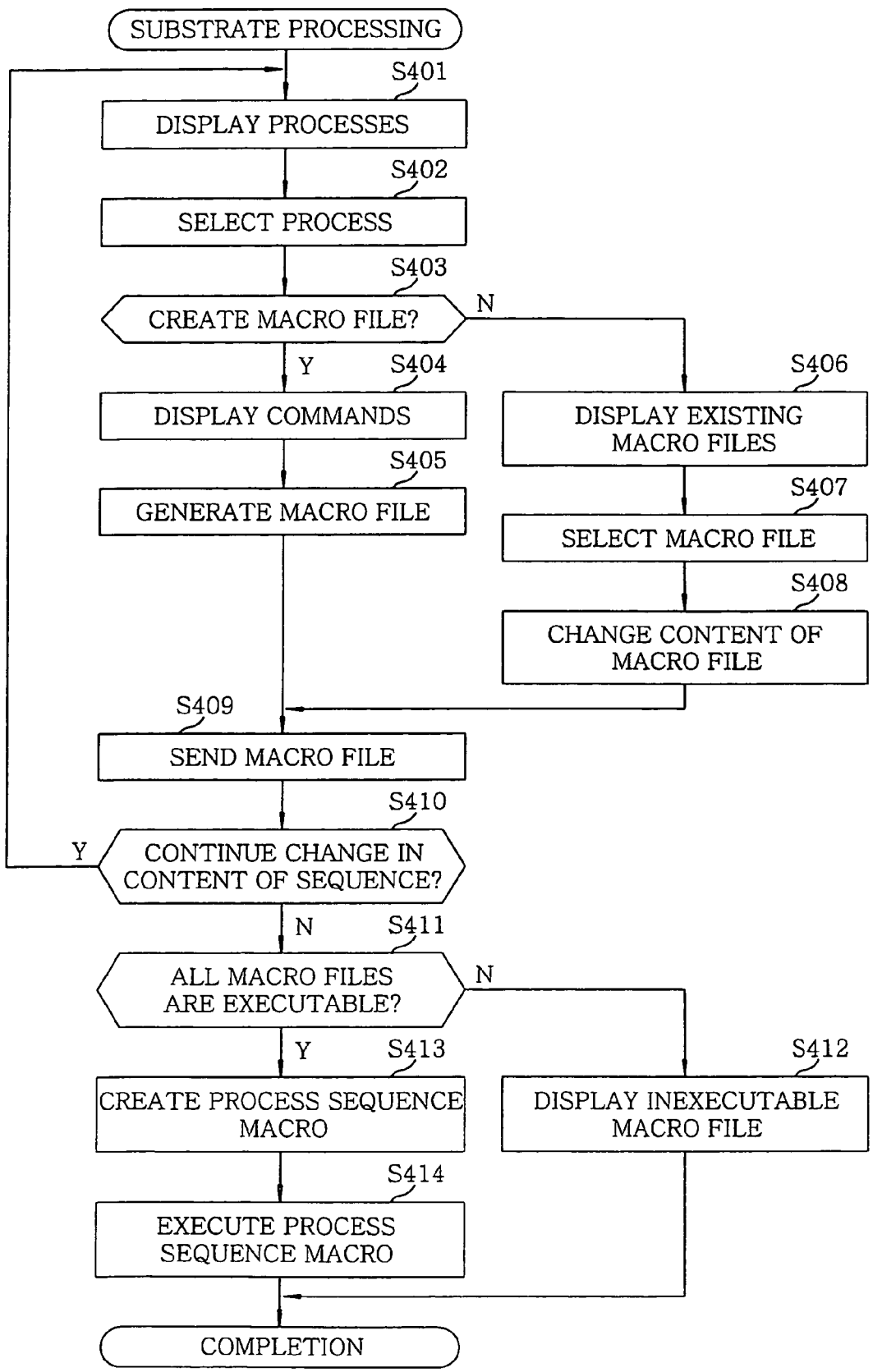
FIG. 4 is a flowchart depicting a substrate processing performed by the substrate processing system in FIG. 1.

FIG. 4 shows a flowchart depicting a substrate processing performed by the substrate processing system in FIG. 1.

In FIG. 4, the user interface 106 displays on its monitor multiple selectable processes of an etching processing (Step S401), and the user selects a process to which content changes of a sequence is to be directed (Step S402).

Subsequently, the user interface 106 displays options as to whether or not to create a new macro file, and then determines whether the user has selected an option to create a new macro file (Step S403).

If it is found in the step S403 that the user has selected the option requesting the generation of a new macro file (YES in the step S403), the user interface 106 displays commands available to carry out the selected process on the monitor (Step S404). Then, the user selects desired commands and arranges the selected commands, thereby generating a macro file (Step S405). At this time, the user determines, for each of the selected commands, a name, a device to be controlled, an operation of the device, a property of a processing content and, if necessary, a subordinate command is also decided. Further, the server communication unit 109 sends the commands selected by the user to the RAM 105 from the server 103 in which the commands converted into hard codes are stored.

If it is found in the step S403 that the user has selected an option to refuse the creation of a new macro file (No in the step S403), the user interface 106 displays existing selectable macro files which are stored in the server 103 and corresponding to the selected process (Step S406). Then, the user selects a desired one from the displayed macro files (Step S407), and by editing commands in the selected macro file, the content of the macro file is modified (Step S408). At this time also, the server communication unit 109 sends the commands designated by the user to the RAM 105 from the server 103.

Subsequently, the server communication unit 109 transmits to the server 103 the new macro file obtained in the step S405 or the macro file whose content is changed in the step S408 (Step S409). Concurrently, the user interface 106 provides options as to whether or not to continue the change in the content of a sequence, and determines whether the user selected an option requesting the continuation of the change of the sequence content (Step S410).

If the user requests in the step S410 the continuation (YES in the step S410), the step 401 is repeated, otherwise, if the user refuses to continue the content change (NO in the step S410), the executor 108 determines the executability of all macro files in the RAM 105 (Step S411).

If any inexecutable macro file is found in the step S411 (No in the step S411), the executor 108 displays the inexecutable macro file on the monitor of the user interface 106 (Step S412), and the process is terminated.

If all the macro files are determined to be executable in the step S411 (YES in the step S411), a process sequence macro is created by combining the macro files in accordance with a corresponding process sequence (Step S413). Then, the executor 108 executes the created process sequence macro to control the operation of each device in the substrate processing apparatus 101, thereby performing an etching process on the semiconductor wafer W (Step S414). Thereafter, the process is completed.

Next, an interlock processing of the substrate processing apparatus 101, performed by the executor 108, is explained. The term 'interlock' herein refers to a control, by controlling operations among processes, performed in a manner that another device is operated only when one device is in a proper state.

A data file, in which a control of a certain operation of a device corresponding to a predetermined macro file (hereinafter referred to as a "interlock") is defined, is not in a form of source code but is concisely described by using IDs (identifiers) in a predetermined data format, e.g., EXCEL and stored in the server 103. An ID, as an instructional or conditional statement for defining an interlock of each device, is a portion corresponding to the control of a certain operation of a corresponding device in, e.g., source codes of sequential operations converted into hard codes, and, like the commands as described, is taken out of the source codes of the sequential operations. Based on such data file, an interlock for a specific operation of each device in the substrate processing apparatus 101 is defined.

Also defined in such a data file by using IDs are an alarm operation for reporting the execution of an interlock of a corresponding device (hereinafter referred to as an "alarm"); and a control of another device related to the interlock of the corresponding device (hereinafter referred to as a "recovery processing").

The data file is described for each of multiple devices corresponding to the specific macro file and, further, is also described for each of multiple operations of a predetermined device among the multiple devices. Based on the data file, an interlock as an interlock processing of a specific operation of each device of the substrate processing apparatus 101, an alarming operation and a recovery processing are defined.

In the substrate processing system 100, the sever 103 contains multiple data files stored in advance, and the server communication unit 109, when creating a data file or changing the content of a data file, sends the data file designated by the user to the RAM 105 from the server 103. Further, in the RAM 105, a data file for each of devices in the above-described macro file is written in accordance with instructions of the user inputted via the user interface 106.

The user interface 106 displays a data file corresponding to a predetermined device designated by the user. The user can change the content of a sequence by editing IDs in the data file displayed on the user interface 106.

The macro file editor unit 107 generates a data file by using the RAM 105 and the user interface 106, and the executor 108 executes the data file created by the macro file editor unit 107 so that the interlock processing of the substrate processing apparatus 101 is carried out.

FIG. 5 schematically shows an example of a data file stored in the server 103. Hereinafter, an interlock processing on an operation of an exhaust valve (hereinafter refer to as a "BPC OUT valve (G82)"), which is installed in the substrate processing apparatus 101 to evacuate a He gas used as a processing gas from the interior of the substrate processing apparatus 101, is described.

In FIG. 5, the leftmost column of an Excel sheet as a data file, i.e., ⌈Abstract Table⌋ defines an operation of a device and an ID ⌈NMS_ILT_BPC_OUT_VLV2⌋ represents an operation of opening the BPC OUT valve (G82). The next column ⌈check Item⌋ describes conditions that need to be satisfied in order to execute such operation of the device, i.e., interlock, wherein an ID ⌈BPC OUT valve (G82) open interlock, the presence of wafer+ESC HV OFF, NMF_ILF_ESC_H-V_OFF_, the presence of wafer+ESC VOLTAGE ZERO, MNS_ILF_ESC_VOLT_ZERO_WAHER⌋ specifies conditions that a semiconductor wafer W is placed on a lower electrode while a high frequency power supply is turned off; or the semiconductor wafer W is placed on the lower electrode while a current generated by a voltage applied from the high frequency power supply is 0.

Next, the column ⌈Factor List⌋ describes an interlock, i.e., a recovery processing, related to the ID inputted in the above-described ⌈check List⌋. For example, it includes IDs describing a condition required for placing the semiconductor wafer W on the lower electrode or for regulating the high frequency power supply off. Here, it is assumed that the ID of the interlock related to the check list is not inputted for the simplicity of explanation.

Further, ⌈Error Code 1⌋ to ⌈Error Code 4⌋ describe an alarm operation warning that the operation of the certain device designated by the ID in the ⌈Abstract Table⌋ has not been performed. For example, an ID ⌈NMS_ERR_BPC_OUT_VLV2⌋ defines an operation of notifying the fact that the BPC OUT valve (G82) is not opened. ⌈Error Code 2⌋ to ⌈Error Code 4⌋ represent IDs of texts to supplement the text of the ⌈Error Code 1⌋. As such, an alarm operation is carried out by converting a string of characters into an ID that is recognizable by the program.

The IDs in the Excel Sheet configured as described above are converted into a CSV file as a preservation format of the data file, and the CSV file is converted again into a parameter file. The executor 108 conducts the interlock processing concerning the operation of opening the BPC OUT valve (G82) by reading the parameter file.

In accordance with this embodiment, since commands for defining operations of devices are stored; macro files are generated for each of multiple processes of an etching processing from the stored commands while a process sequence macro in which the generated macro files are combined is created; and the process sequence macro in which the macro files are combined according to a process order is performed, it becomes possible for the user: to change the content of a sequence by changing the content of the macro files through the use of the commands without a need to rewrite source codes; and, to change the content of a process sequence frequently without requiring a great number of works that should be accomplished by the user. Especially, the convenience of user is improved since the user can readily change the content of the sequence just by acquiring the technique of writing the macro files.

Since the macro file editor unit 107 includes the user interface 106 in the above-described substrate processing system 100, the user can change the content of the macro files readily and further, since a command is in a form of source codes of a sequential operation that is converted into hard codes, a compiling or linking step is not needed when the executor 108 performs the process sequence macro, thereby greatly reducing the number of works that should be performed by the user.

Further, since the macro files generated by the macro file editor unit 107 are stored in the server 103 in the above-described substrate processing system 100, the user can recycle already generated macro files when changing the content of a sequence, so that the number of works of the user can be greatly reduced.

Moreover, in the aforementioned substrate processing system 100, since all macro files, existing in the RAM 105, including those received from the PC 104 are subjected to a verification (determination) process for examining whether they are executable, a process error can be prevented from occurring when performing a process sequence macro containing macro files, thereby improving operation efficiency.

Further, in accordance with this embodiment, since the server 103 stores therein a data file defining device interlocks corresponding to a macro file; the macro file editor unit 107 creates the data file; and the executor 108 executes an interlock of a device based on the created data file, the user is enabled to change a sequence with respect to the interlock by using the date file written in a predetermined data format without a need to rewrite source codes. Particularly, when evaluating a new device or examining an inappropriateness of the device's application to the substrate processing apparatus 101, if the user learns how to write data files, frequent changes in the content of the interlock becomes possible.

Further, in accordance with this embodiment, since a data file also defines an alarm, which reports a completion of a device's interlock and defines a recovery processing related to the interlock of the corresponding device, the user can change the content of the alarm to notify the completion of the interlock of the device and the recovery processing concerning the interlock of the corresponding device without rewriting source codes. As a result, the user can readily identify which alarm is generated when a particular interlock of a device is performed even without reading the source codes.

A substrate processing system in accordance with a second embodiment of the present invention will now be described.

Figure 6:
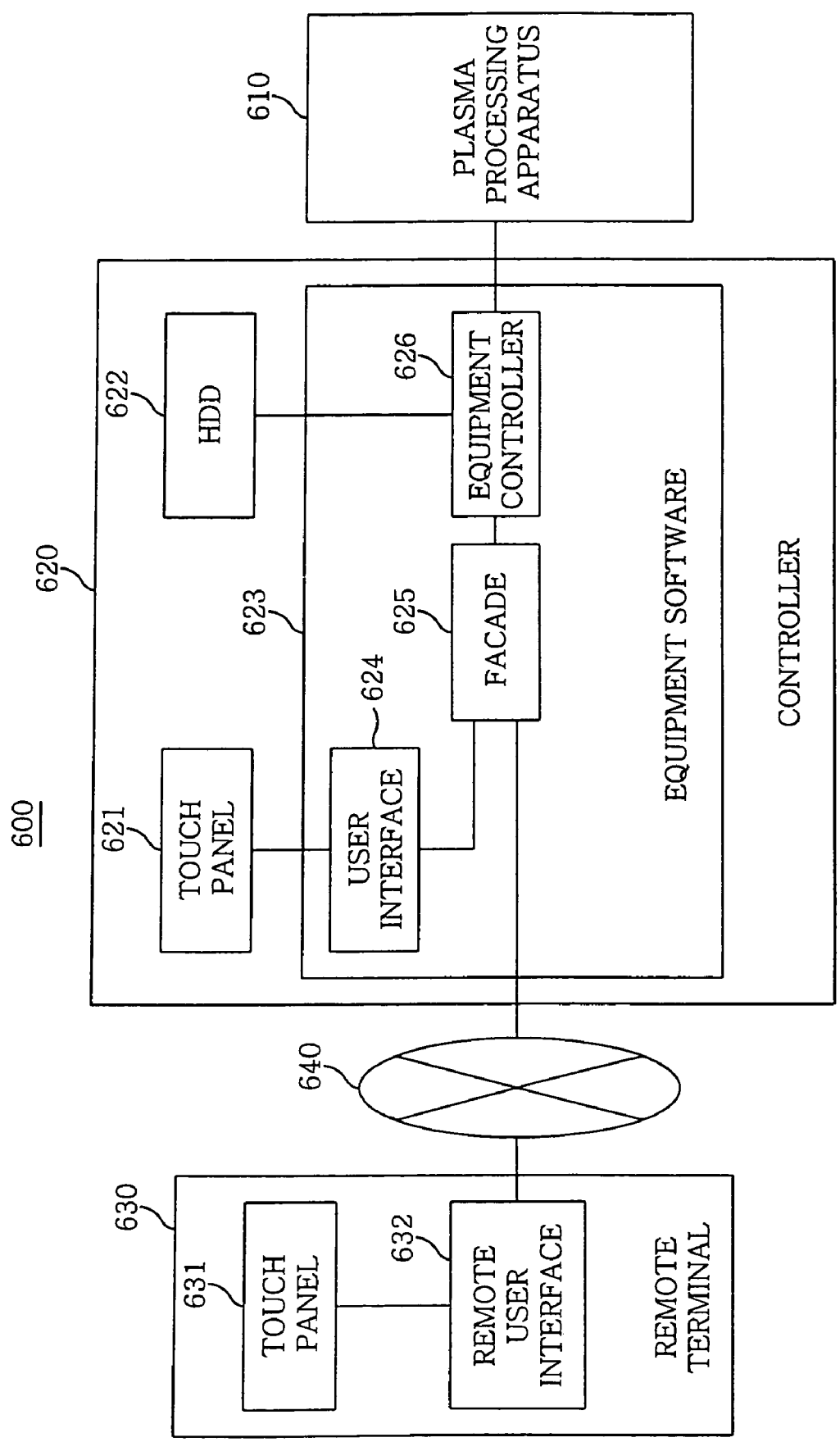
FIG. 6 illustrates a schematic diagram of a substrate processing system in accordance with a second embodiment of the present invention.

Referring to FIG. 6, there is described a schematic configuration of a substrate processing system in accordance with the second embodiment.

In FIG. 6, a substrate processing system 600 includes a plasma processing apparatus 610 for performing an etching process on a semiconductor wafer W; a controller 620 disposed adjacent to the plasma processing apparatus 610, for controlling the plasma processing apparatus 610; a remote terminal 630 placed by isolating it from the plasma processing apparatus 610, for remote-controlling the plasma processing apparatus 610 via the controller 620; and a LAN (Local Area Network) 640 such as Ethernet (a registered trademark) for connecting the controller 620 and the remote terminal 630.

The controller 620 includes a touch panel (operation input unit) 621 by which the user inputs a desired operation; an HDD (Hard Disk Drive) 622 serving as a storage unit for storing recipes for use in the etching processing and control parameters (target values of temperature, pressure, kinds of gases and their flow rates, time and the like); and equipment software 623 for controlling the etching processing. The equipment software 623 has an user interface 624 for controlling the operation of the touch panel 621; an input determination unit 625 (Facade) (input control unit, input source determination unit) for determining an input source of the operation designated by the user, which will be described later; and an equipment controller 626 for controlling multiple devices constituting the plasma processing apparatus 610 based on the recipes and the control parameters read from the HDD 622 or an operation item selected by the user, which will be also described later. The user interface 624 is connected to the touch panel 621 and the input determination unit 625, which is in turn coupled to the remote user interface 632 via the LAN 640. Further, the equipment controller 626 is connected to the input determination unit 625, the HDD 622 and the plasma processing apparatus 610.

The user interface 624 displays an operation menu list containing multiple operation items on the touch panel 621. If the user selects a desired operation item from the displayed operation menu list by touching it, for example, with fingers, the user interface 624 sends the selected operation item to the equipment controller 626 via the input determination unit 625.

Here, the operation items displayed on the touch panel 621 relate to, e.g., a selection and a content edition of recipes and control parameters employed for the etching process or a release of a stoppage (alarm) of the plasma processing apparatus 610 caused by a minor trouble, and the like.

The remote terminal 630 includes a touch panel (another operation input unit) 631 by which the user inputs a desired operation; and a remote user interface (another software) 632 for controlling the operation F of the touch panel 631. The remote user interface 632 displays an operation menu list containing multiple operation items on the touch panel 631. If the user selects a desired operation item from the displayed operation menu list by touching it with, e.g., fingers, the remote user interface 632 sends the touched operation item as the operation item selected by the user to the equipment controller 626 via the LAN 640 and the input determination unit 625. Further, the remote terminal 630 can be substituted by a personal computer available on the market.

When the operation item selected by the user is received and if it requires the user to observe the plasma processing apparatus 610 directly, the input determination unit 625 determines the sender of the operation item among the user interface 624 and the remote user interface 632. If it is determined that the corresponding operation item is transmitted from the remote user interface 632, the received operation item is not sent to the equipment controller 626. If it is found to be sent from the user interface 124, however, the received operation item is transferred to the equipment controller 626.

Here, the operation item requiring the user's firsthand observation of the plasma processing apparatus 610 refers to, e.g., a release of a stoppage of the plasma processing apparatus 610 caused by a serious trouble, a selection of a recipe for a transfer process of the semiconductor wafer W conducted in the atmosphere or content editing thereof.

Further, in a certain condition where, for example, another user is editing the recipe by using either one of the touch panels 621 and 631, the input determination unit 625 prevents the user from editing the corresponding recipe at the other touch panel.

Here, the remote user interface 632 and the user interface 624 are developed by using a same development tool and have same contents. That is, source codes of each of the remote user interface 632 and the user interface 624 are described by using, e.g., JAVA (registered trade mark), and their contents are same as well. At this time, each of the controller 620 and the remote terminal 630 needs to be equipped with an interpreter (for example, JAVA (registered trade mark) Virtual Machine). Moreover, though an OS (Operation System) in which the user interface 624 and the remote user interface 632 are operated is not limited to any specific one if the source codes of the two are described in JAVA, it is preferable to use a general-purpose OS such as Windows (a registered trademark).

As described, since the user interface 624 and the remote user interface 632 are developed by using a same development tool and have the same contents, the operation menu lists displayed on display panels of the touch panels 631 and 621 are also identical.

Next, a process for controlling the plasma processing apparatus 610 by using the controller 620 in FIG. 6 is described.

Figure 7:
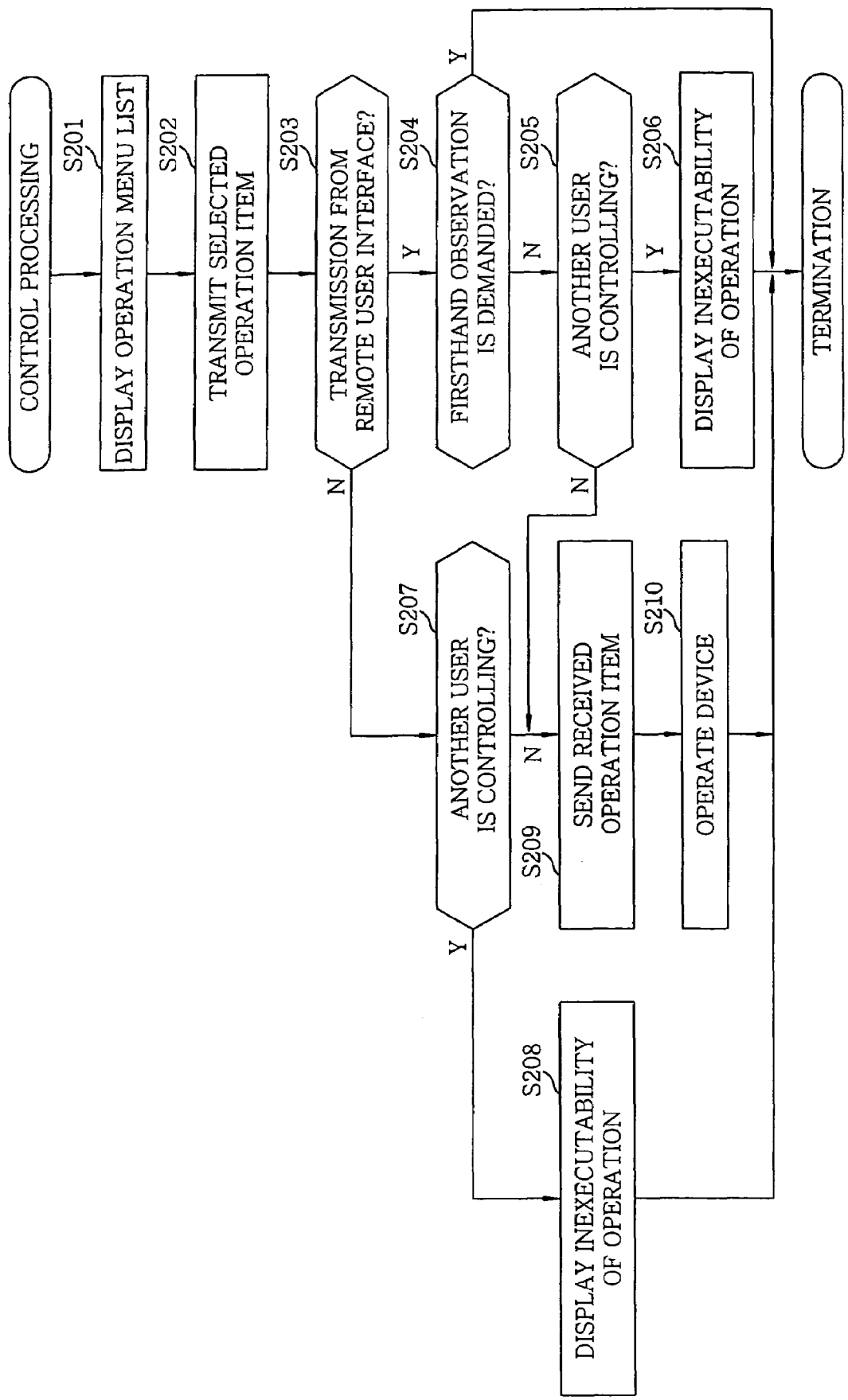
FIG. 7 is a flow chart explaining a control process of a plasma processing apparatus performed by the controller shown in FIG. 6.

FIG. 7 is a flow chart describing a control process of the plasma processing apparatus 610 executed by the controller 620 in FIG. 6.

Referring to FIG. 7, if a user turns on the operation startup switch (not shown) of a plasma processing apparatus provided at the controller 620 or the remote terminal 630, the user interface 624 and the remote user interface 632 display an operation menu list on the touch panels 621 and 631 (Step S201).

If the user selects a desired operation item by touching it with a finger on the touch panel 621 or the touch panel 631, the user interface 624 or the remote user interface 632 sends the selected operation item to the input determination unit 625 (Step S202).

Then, the input determination unit 625 determines whether the received operation item has been transmitted from the remote user interface 632 (Step S203).

If it is found in the step S203 that the operation item has been received from the remote user interface 632 (YES in the step S203), the input determination unit 625 then decides whether the operation item requires the user to observe the plasma processing apparatus 610 on the spot (Step S204).

If the operation item is found in the step S204 to demand a firsthand observation of the user (YES in the step S204), the process is terminated. If the operation item is found not to require the firsthand observation in the step S204 (NO in the step S204), however, the input determination unit 625 checks whether another user is controlling the plasma processing apparatus 610 by using the touch panel 621 when the operation item is received (Step S205).

If it is determined in the step S205 that another user is currently controlling the plasma processing apparatus 610 (YES in the step S205), the input determination unit 625 notifies the remote user interface 632 that the received operation item is not executable, and the remote user interface 632 reports the inexecutability of the plasma processing apparatus 610 on the touch panel 631 (Step S206). Then, the process is terminated.

Referring back to the step S203, if it is found that the operation item is not transmitted from the remote user interface 632 (NO in the step S203), the input determination unit 625 decides whether another user is controlling the plasma processing apparatus 610 by using the touch panel 631 when the operation item is received (Step S207).

If it is noticed in the step S207 that another is controlling the plasma processing apparatus 610 (YES in the step S207), the input determination unit 625 reports the user interface 624 that the received operation item cannot be executed, and the user interface 632 then reflects the inexecutability of the desired operation of the plasma processing apparatus 610 on the touch panel 621 (Step S208). Then, the process is terminated.

If the determination in the step S205 or S207 reveals, however, that there is no other user who is controlling the plasma processing apparatus 610 (NO in the step S205 or NO in the step S207), the input determination unit 625 sends the received operation item to the equipment controller 626 (Step S209), and the equipment controller 626 then operates multiple devices constituting the plasma processing apparatus 610 based on the received operation item (Step S210). Then, the process is terminated.

In accordance with the embodiment described above, the user interface 624 controls the operation of the touch panel 621, and the remote user interface 632, whose source codes have the same contents as those of the user interface 624, controls the operation of the touch panel 631. As a result, control of the touch panels 621 and 631 can be accomplished by using the same software, and the number of works that should be done by the soft engineer can be reduced. Furthermore, the number of processes required for creation of software for controlling operations of the plasma processing apparatus 610 and the remote controller 630, and, further, the number of works for managing them can also be reduced.

In the above-described substrate processing apparatus 600, the input determination unit 625 restricts an operation input from either one of the touch panels 621 and 631. Therefore, in controlling the plasma processing apparatus 610, e.g., in editing a recipe of the substrate processing (process), duplicative operation inputs from the touch panels 621 and 631 can be avoided, thereby enabling a smooth control of the plasma processing apparatus 610.

Moreover, since the input determination unit 625 determines an input source of an operation item inputted by the user, it can prevent an operation requiring direct observation of the user from being inputted via the touch panel 631, whereby the safety of the substrate processing can be improved.

Further, since the input determination unit 625 and the remote user interface 632 are connected to each other via the LAN 640, the controller 620 and the remote terminal 630 can communicate through a general-purpose protocol, e.g., TCP/IP, which helps an efficient build-up of the substrate processing system 600.

Further, since the OS in which the remote user interface 632 is operated is of a general-purpose, costs of the remote terminal 630 can be reduced while improving the convenience of user in inputting operations, and the user of the remote terminal 630 need not invest in new equipment.

Moreover, since the operation menu lists displayed on the touch panels 621 and 631 are identical, the user can input a desired operation through the use of any one of the touch panels.

In addition, if one of the user interface 624 and the remote user interface 632 is upgraded, they may be programmed such that the upgraded one sends the fact that it is upgraded to the other, whereby the number of processes required to manage the software for use in controlling the plasma processing apparatus 610 and the remote terminal 630 can be further reduced.

Next, a substrate processing system in accordance with a third embodiment of the present invention will be explained in detail.

Figure 8:
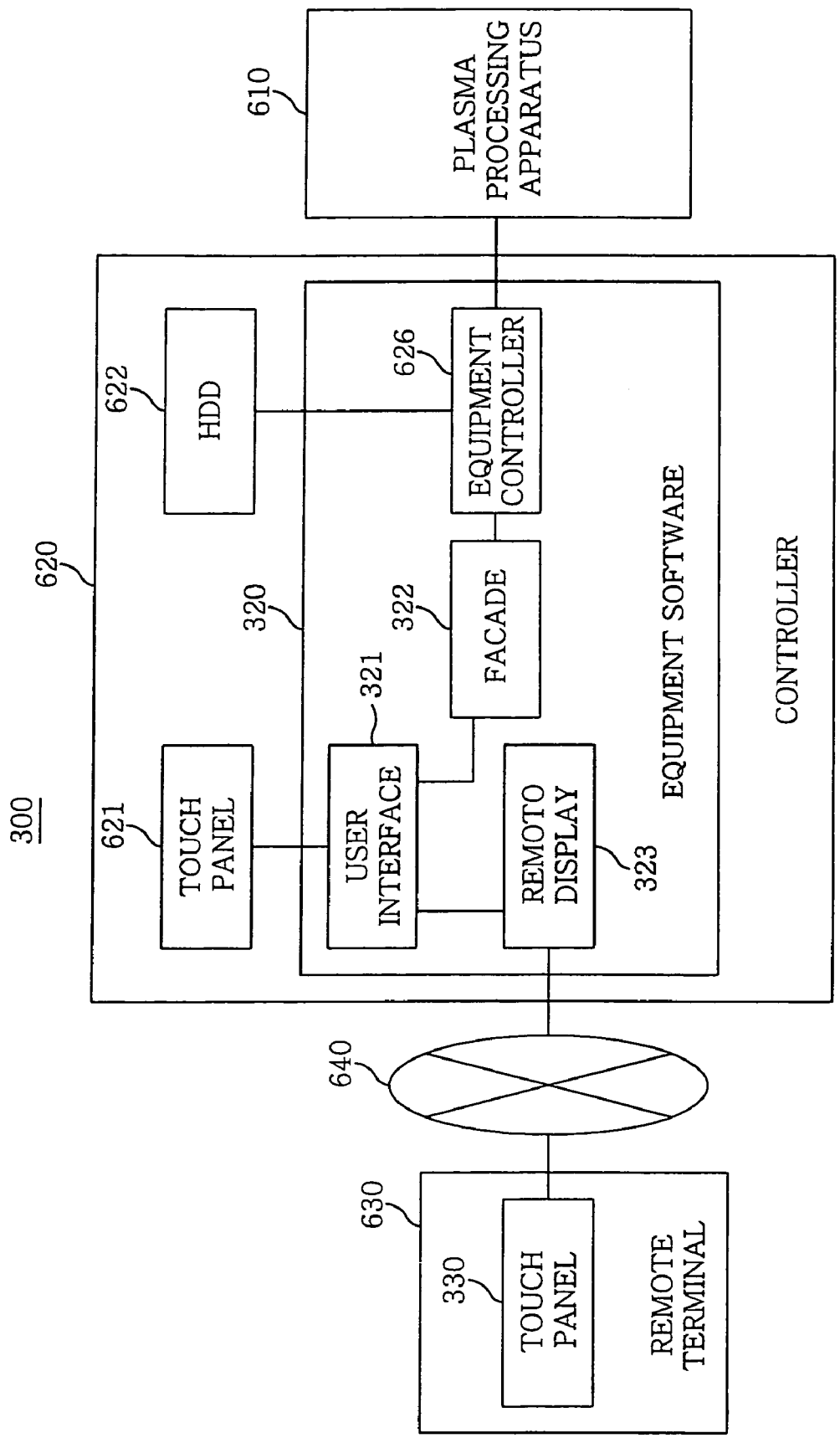
FIG. 8 illustrates a schematic diagram of a substrate processing system in accordance with a third embodiment of the present invention.

Referring to FIG. 8, a schematic configuration of a substrate processing system in accordance with the third embodiment of the present invention is described. The basic configuration and functions of the substrate processing system of the third embodiment closely resemble those of the substrate processing system provided in the second embodiment. Therefore, description of like parts and functions will be omitted; and instead distinctive parts and functions will be focused on and elaborated.

In FIG. 8, the substrate processing system 300 includes a plasma processing apparatus 610; a controller 620; a remote terminal 630; and a LAN 640, wherein the controller 620 has device software 320 instead of the equipment software 623. The device software 320 has an user interface 321 for controlling the operation of a touch panel 621; an input determination unit (Facade) 322 for determining an input source of an operation designated by the user, which will be described later in detail; an equipment controller 626 for controlling multiple devices constituting the plasma processing apparatus 610 based on operation items selected by the user, which will be also described later; and a remote display 323 serving to recognize an operation input from a touch panel 330 as an operation input from the touch panel 621, which will be also described later. The user interface 321 is connected to the touch panel 621, the input determination unit 322 and the remote display 323, wherein the remote display 323 is in turn coupled to the touch panel 330 via the LAN 640. Further, the equipment controller 626 is connected to the input determination unit 322, an HDD 622 and the plasma processing apparatus 610.

The user interface 321 displays an operation menu list containing multiple operation items on the touch panel 621. If the user selects a desired operation item from the displayed operation menu list by, for example, touching it, the user interface 321 sends the touched-operation item as the operation item selected by the user to the equipment controller 626 via the input determination unit 322. Here, the operation menu list displayed on the touch panel 621 by the user interface 321 is identical to that displayed by the user interface 624.

Further, the remote terminal 630 incorporates the touch panel 330 through which the user inputs a desired operation. The remote terminal 630 can be replaced by a personal computer available on the market.

The remote display 323 is software capable of executing a VNC (Virtual Network Computing), and serves to recognize a predetermined region (not shown) on the touch panel 330 as the touch panel 621; shows on the predetermined region of the touch panel 330 the same contents that are displayed on the touch panel 621 by the user interface 321; and identifies an input to the predetermined region as an input to the touch panel 621.

Therefore, the remote display 323 displays on the aforementioned predetermined region the operation menu list displayed on the touch panel 621, and, if the user selects a desired operation item from the operation menu list displayed on the predetermined region by touching it, it sends the touched operation item as the operation item selected by the user to the user interface 321. At this time, the user interface 321 transmits the received operation item as the operation item selected by the user to the equipment controller 626 via the input determination unit 322.

When the operation item selected by the user is received, the input determination unit 322 decides whether the received operation item has been sent from the touch panel 621 or the predetermined region of the touch panel 330. In case the received operation item requires user's direct observation of the plasma processing apparatus 610, the input determination unit 322 does not send the received operation item to the equipment controller 626 when the operation item is found to be inputted from the predetermined region but sends the received operation item to the equipment controller 626 when the operation item has been inputted from the touch panel 621.

In a certain condition, e.g., where a user is editing a recipe via either one of the touch panel 621 and the predetermined region of the touch panel 330, the input determination unit 322 prohibits another user from editing the corresponding recipe via the other touch panel.

A control process of the plasma processing apparatus 610 performed by the controller 620 will now be described with reference to FIG. 8.

Figure 9:
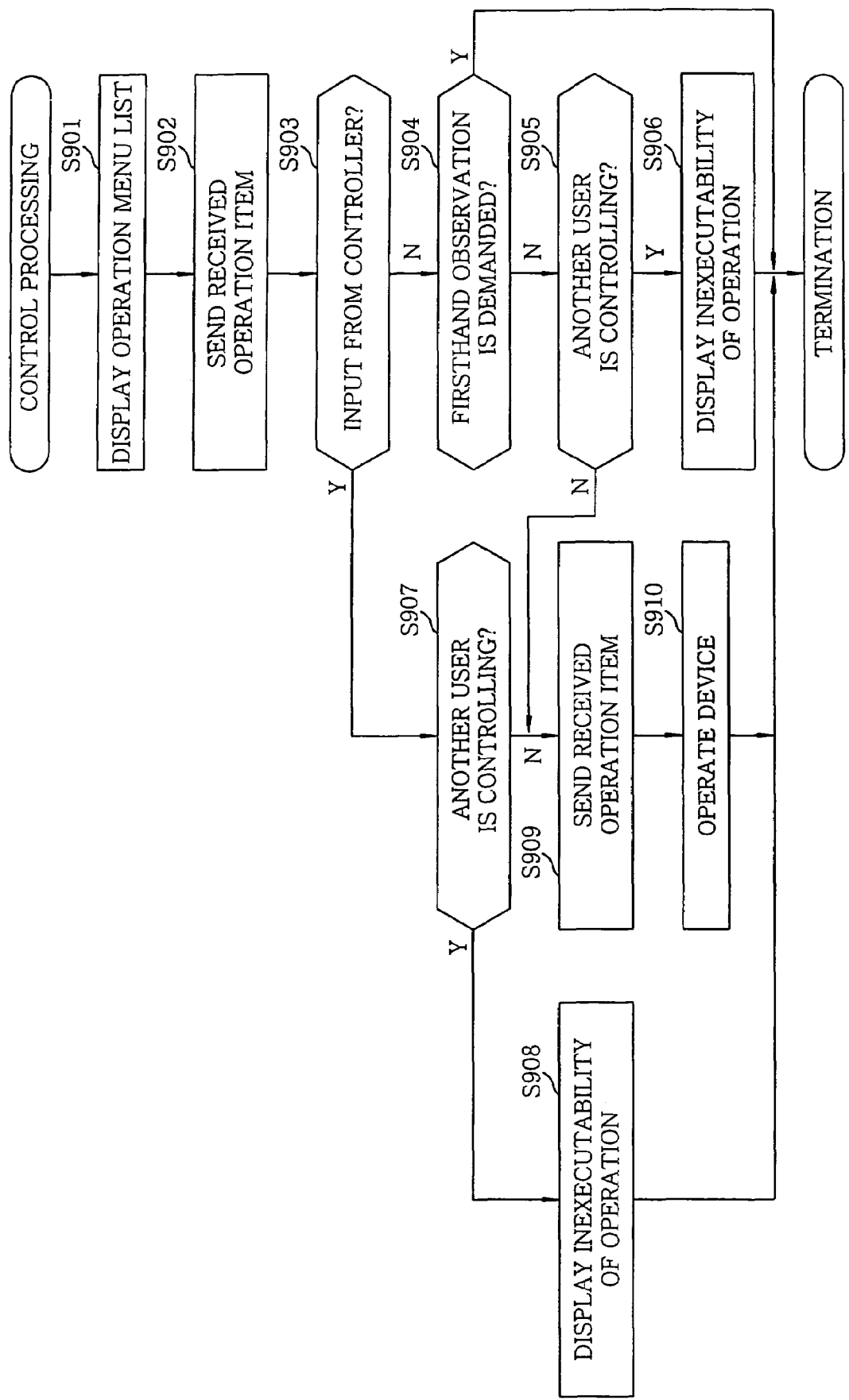
FIG. 9 shows a flow chart describing a control process of a plasma processing apparatus performed by the controller shown in FIG. 8.
Figure 10:
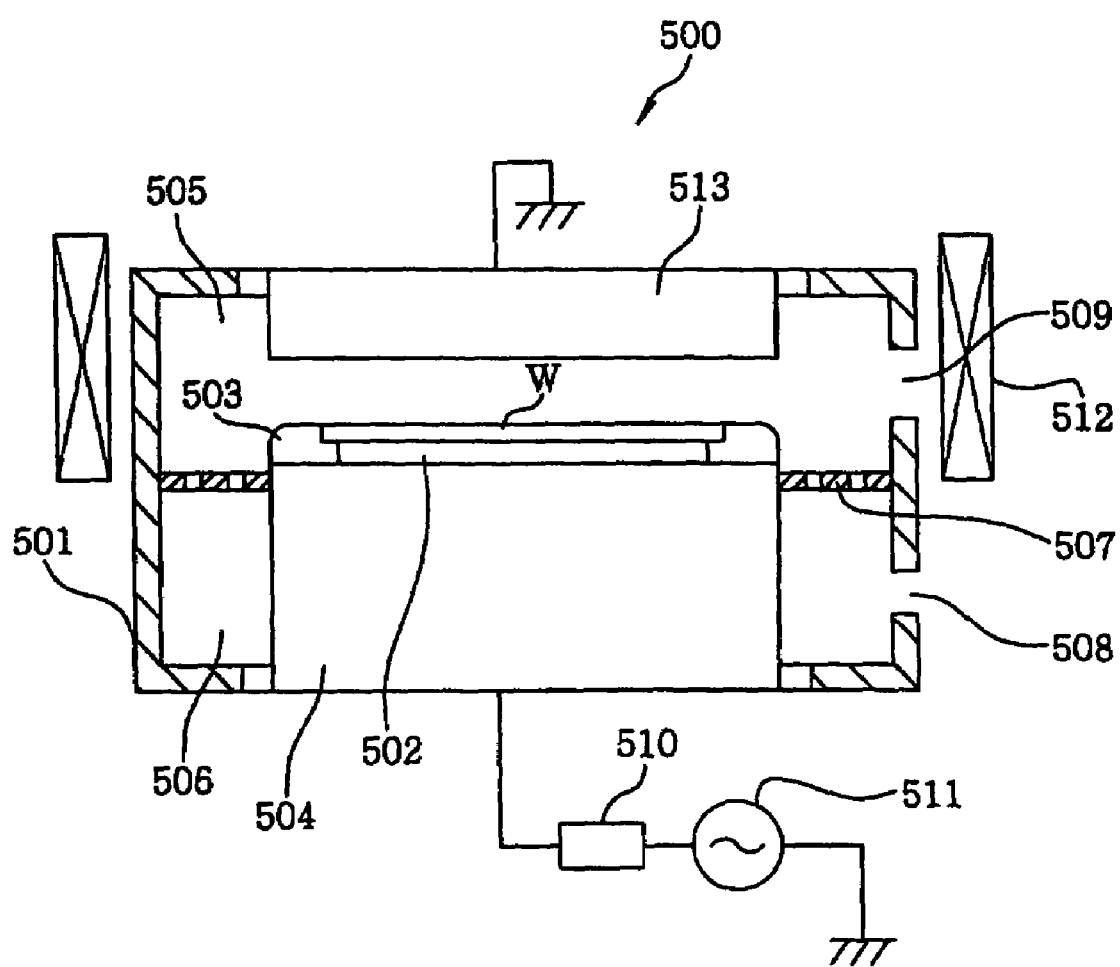
FIG. 10 shows a schematic diagram of a conventional substrate processing apparatus.
Figure 11:
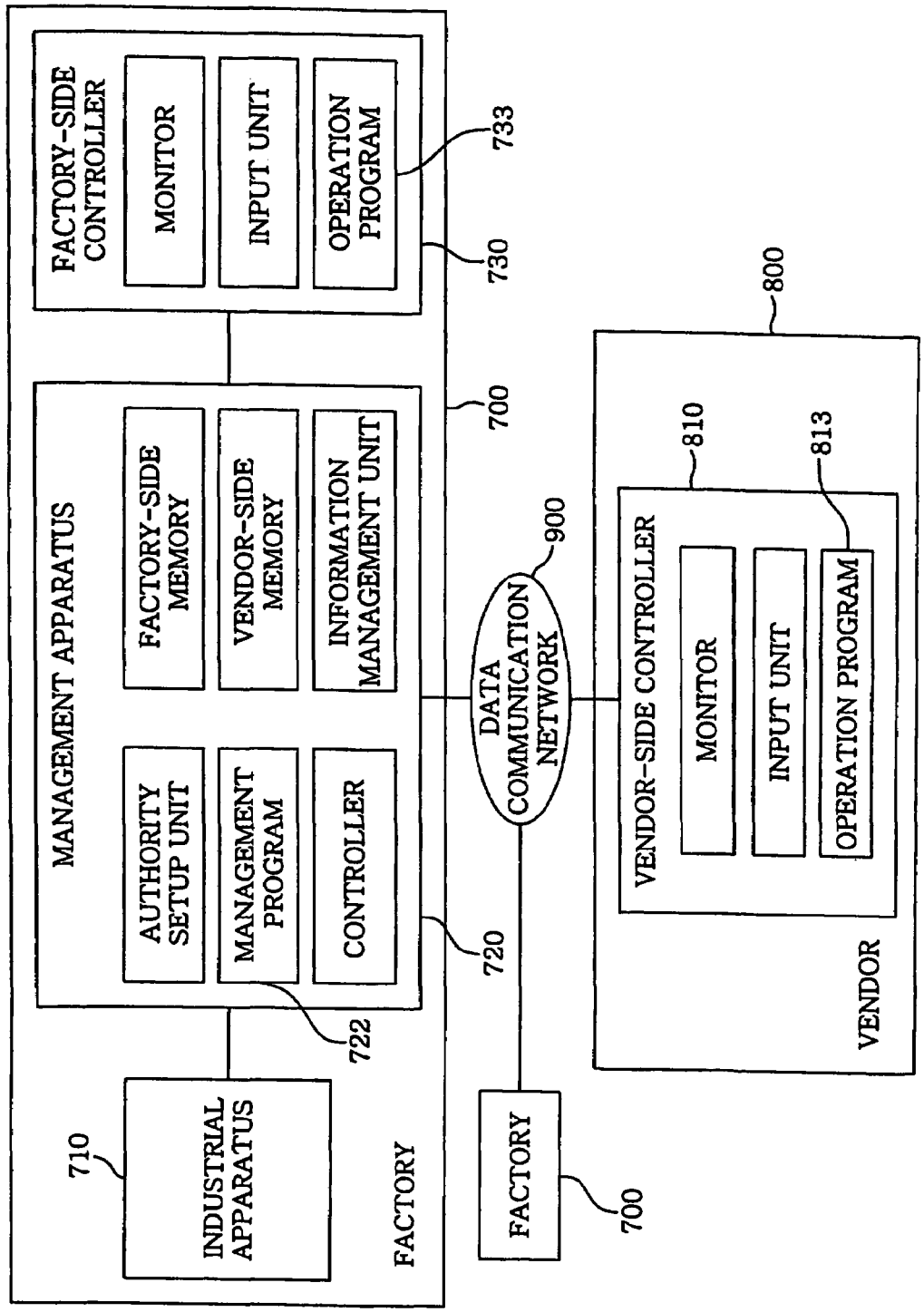
FIG. 11 illustrates a schematic diagram of a conventional remote control system.

FIG. 9 is a flowchart explaining the process for controlling the plasma processing apparatus 610 by using the controller 620 in FIG. 8.

Referring to FIG. 9, if the user turns on an operation startup switch (not shown) of a plasma processing apparatus incorporated in the controller 620 or the remote terminal 630, the user interface 321 displays an operation menu list on the touch panel 621, and the remote display 323 shows the same operation menu list on the predetermined region of the touch panel 330 (Step S901).

Then, if the user selects a desired operation item by touching it on the touch panel 621, the user interface 321 transmits the selected operation item to the input determination unit 322, whereas the remote display 323 sends the selected operation item to the user interface 321, and the user interface 321 transfers it to the input determination unit 322 if the user selects the desired operation item by touching it on a predetermined region of the display panel 330 (Step S902).

The input determination unit 322 determines whether the operation item is inputted from the touch panel 621 (Step S903).

If it is found in the step S903 that the operation item is not inputted from the touch panel 621 (NO in the Step S903), the input determination unit 322 then decides whether the operation item requires the user's direct observation of the plasma processing apparatus 610 (Step S904).

If the determination result in the step S904 reveals that the operation item demands the firsthand observation of the user (YES in the step S904), the process is terminated. If the operation item does not require the user to observe directly in the step S904 (NO in the step S904), however, the input determination unit 322 checks whether another user is controlling the plasma processing apparatus 610 by using the touch panel 621 when the operation item is received (Step S905).

If it is determined in the step S905 that another user is currently controlling the plasma processing apparatus 610 (YES in the step S905), the input determination unit 322 informs the remote display 323 of the fact that the received operation item is not executable, and the remote display 323 then reports the inexecutability of the plasma processing apparatus 610 on the predetermined region (Step S906). Then, the process is terminated.

Referring back to the step S903, if the operation item is found to be transmitted from the touch panel 621 (YES in the step S903), the input determination unit 322 decides whether there exists another user who is controlling the plasma processing apparatus 610 via the predetermined region of the touch panel 330 when the operation item is received (Step S907).

If the determination result in the step S907 shows that there is another user who is currently using the plasma processing apparatus 610 (YES in the step S907), the input determination unit 322 informs the user interface 321 that the received operation item cannot be executed, and the user interface 321 then reports the inexecutability of the desired operation of the plasma processing apparatus 610 on the touch panel 621 (Step S908). Then, the process is terminated.

If the step S905 or S907 finds, however, that there is no other user who is controlling the plasma processing apparatus 610 (NO in the step S905 or No in the step S907), the input determination unit 322 sends the received operation item to the equipment controller 626 (Step S909), and the equipment controller 626 operates a plurality of devices constituting the plasma processing apparatus 610 based on the received operation item (Step S910). Then, the process is terminated.

In accordance with the embodiment described above, the user interface 321 displays on the touch panel 330 operation items capable of being inputted to the touch panel 621, and the remote display 323 shows the operation items on the touch panel 621 and recognizes an input to the touch panel 330 as an input to the touch panel 621. Therefore, software for controlling the operation of the touch panel 330 is not required, so that the number of processes for creating and managing software for use in controlling the plasma processing apparatus 610 and the remote terminal 630 can be reduced.

Further, since the plasma processing apparatus 610 performs an etching process on a semiconductor wafer W in the substrate processing systems 600 and 300, the user can execute the etching process of the semiconductor wafer W by using the remote terminal 630.

Although the first embodiment has been described for the substrate processing system 100 where creation of macro files and changes of their contents are all performed in the RAM 105, the place for creating and changing the macro files is not limited to the RAM 105. For example, it is also possible that the PC communication unit 110 may send commands and macro files present in the RAM 105 to the PC 104 at a time of creating a macro file or changing the content of a macro file; then, the user generates a macro file or changes the content of a macro file in the PC 104 through the use of a keyboard or a mouse; and the PC communication unit 110 transmits the macro file created or changed in the PC 104 to the RAM 105. Through such process, the user can generate a macro file or change the content of a macro file by using the PC 104, so that the convenience of user can be improved. Further, the user can also performs a creation of a data file or a change in the content of a data file by using the PC 104.

Furthermore, in the substrate processing system 100, commands, macro files and process sequence macros are all stored in the server 103. However, the storage unit for storing them is not limited to the server 103. For example, the commands are stored in the server 103 while the macro files and process sequence macros are stored in a separate external HDD and the like (another storage unit). Further, data files can be stored in a further separate external HDD and the like (still another storage unit). As a result, the risk of loss of data due to the system troubles can be lowered. For the purpose of simplifying the configuration of the substrate processing system 100, however, it is preferable to store all of the commands, macro files, process sequence macros and data files in the server 103.

In addition, a macro file may not be stored for each process by a one-to-one correspondence; that is, there can be stored multiple macro files corresponding to a single process. Accordingly, when changing the contents of existing macro files is required, the user can select from the stored multiple macro files a macro file which is the most similar to a desired sequential operation and change the content thereof, thereby improving the work efficiency of the user.

Furthermore, in the first embodiment, a macro file in which multiple commands are arranged is created for each of processes in an etching processing of a semiconductor wafer W, and, at the same time, a process sequence macro, conceptualized as an upper-level macro file, is generated by integrating the thus created macro files. However, the present invention is not limited thereto. That is, a process sequence macro as an upper-level macro file can be created by generating a macro file first in which multiple commands are arranged and then sorting multiple macro files thus created according to a process sequence. By hierarchizing the macro files, a single stable interface can be provided, and, further, the interface allows operators to access various properties of lower-layer command. Moreover, by sorting the multiple macro files according to a process sequence, sorting and combining of the macro files can be easily performed.

Further, though the substrate processing apparatus 101 and the substrate processing controller 102 are described as separate elements in the substrate processing system 100, the substrate processing apparatus 101 and the substrate processing controller 102 need not be separated. For example, the substrate processing apparatus 101 may be configured to incorporate an element equivalent to the substrate processing controller 102.

Though it is preferable that a macro file created by the substrate processing system 100 has a format of XML for general purpose, the format is not limited thereto but can be in any format as long as it can be written through arrangements of commands.

Though data files created by the substrate processing system 100 are concisely described in an Excel format by using IDs, the format is not limited thereto. That is, any data format that can be read by general PC software can be employed. In such a case, data files edited by an external computer or another substrate processing apparatus can be used in the apparatus, and, additionally, a specification of a fixed format, e.g., a specification describing an interlock of the substrate processing apparatus 101, can be easily generated by using the data files.

Moreover, though the input determination units 625 and 322 in the substrate processing apparatuses 600 and 300 in accordance with the second and the third embodiment, respectively, restrict an operation input of the user based on the necessity for user's firsthand observation or presence of another user, the restriction can be based on operation skills of the user or the user's job level so that the security of the substrate processing system can be improved, and an accident that might be caused by a wrong operation by the user can be prevented.

Although the plasma processing apparatus 610 and the controller 620 are installed as separate elements in the substrate processing system 600 and the substrate processing system 300 described above, they can be integrated as one element, thereby obtaining a compact substrate processing system.

In addition, since a current situation of the plasma processing apparatus 610 can be displayed on an operation panel of the remote terminal 630 on a real-time basis via the remote user interface 632 or the remote display 323, a troubleshooting of the plasma processing apparatus 610 can be accomplished by a user who is located at a place isolated from the plasma processing apparatus 610.

In the above-described substrate processing system 600 and the substrate processing system 300, an operation item is selected by touching an operation menu list displayed on an operation panel. However, the operation item can be selected differently, for example, by pointing of a pointing device such as a mouse or by inputting a name of a desired recipe or a name of a control parameter through the use of a keyboard. Moreover, it is also preferable to select the operation item by putting an electronic pen such as a stylus down on the operation panel.

Though a single remote terminal 630 is connected to a single controller 620 in the substrate processing systems 600 and 300 described above, there is no limit in the number of remote terminals 630 coupled with the controller 620. For example, multiple controllers 620 and multiple remote terminals 630 can be connected via an public network such as the Internet, whereby the user can control a number of plasma processing apparatuses 610 by using any one of the multiple remote terminals 630.

Further, although the above-described plasma processing apparatus 610 is an etching processing apparatus, the present invention can be applied to any semiconductor manufacturing apparatuses, e.g., an exposure apparatus, a CVD apparatus, an etching apparatus, a CMP apparatus, a resist coating apparatus, a developing apparatus, an ashing apparatus, an inspecting apparatus, and so forth.

Moreover, the object of the present invention can also be achieved by allowing an operation unit (CPU, MPU, or the like) of the substrate processing system 100 or 600, or the substrate processing controller 102 or the controller 620 to execute program codes of software for use in realizing functions of the above-explained embodiments of the present invention. In such a case, the program codes themselves constitute the invention.

A floppy (registered trademark) disc, a hard disc, a magneto-optical disc, a CD-ROM, a CD-R, a CD-RW, a DVD-ROM, a DVD-RAM, a DVD-RW, a DVD+RW, a magnetic tape, a nonvolatile memory card, a ROM, and the like, can be used as a storage medium for supplying the program codes to the operation unit.

Furthermore, in addition to the method for realizing the functions of the embodiments by way of allowing the operation unit to execute the program codes, it is also possible to obtain the same functions by controlling, e.g., an OS (operating system) operating on a computer to partially or entirely perform actual processes based on an indication of the program codes.

Moreover, the server 103 and the PC 104 can be integrated or the PC 104 can be configured to further serve as the server 103.

Though the embodiments has been described for the case where an etching process is exemplified as a substrate processing conducted by the substrate processing system 100 and the substrate processing system 600, the substrate processing executed by the substrate processing system 100 and the substrate processing system 600 is not limited to the etching process but can be, e.g., a CVD process, an ashing process, an ion doping process, a sputtering process, and the like.

The invention claimed is:

1. A substrate processing apparatus for performing a processing including a plurality of processes on a substrate by operating a number of devices incorporated in the substrate processing apparatus, which comprises:
    a storage unit for storing therein commands describing operations of the devices;
    a generation unit for generating macro files, each of which corresponds to each of the processes, from the stored commands and creating a process sequence macro by combining the generated macro files; and
    an execution unit for executing the process sequence macro;
    wherein the storage unit further stores therein a data file defining a control of an operation of each of the devices corresponding to the macro files; the generation unit generates the data file; and the execution unit executes the control of the operation of each of the devices based on the generated data file; and
    wherein the data file also defines an alarming operation for reporting a completion of the control of the operation of each of the devices; and the data file also defines a control of another device related to the operation of each of the devices.

2. The substrate processing apparatus of claim 1, wherein the generation unit includes a user interface.

3. The substrate processing apparatus of claim 1 or 2, wherein the commands are converted into hard codes.

4. The substrate processing apparatus of claim 1, further comprising another storage unit for storing the generated macro files.

5. The substrate processing apparatus of claim 4, wherein said another storage unit is identical to the storage unit.

6. The substrate processing apparatus of claim 1, further comprising a communication unit for sending the macro files to an external device and receiving the macro files from the external device.

7. The substrate processing apparatus of claim 6, further comprising a verification unit for examining whether a sequence of each of the macro files is normal.

8. The substrate processing apparatus of claim 1, wherein the storage unit incorporates still another storage unit for storing the data file defining the control of the operation of each of the devices corresponding to the macro files.

9. The substrate processing apparatus of claim 1, wherein the data file defines an interlock for the operation of each of the devices.

10. A substrate processing method for performing a processing including a plurality of processes on a substrate by operating a multiplicity of devices incorporated in a substrate processing apparatus, the method comprising the steps of:
    storing commands defining operations of the devices;
    generating macro files, each of which corresponds to each of the processes, from the stored commands and creating a process sequence macro by combining the generated macro files; and
    executing the process sequence macro;
    wherein the storage step further stores a data file defining a control of an operation of each of the devices corresponding to the macro files; the generation step generates the data file; and the execution step executes the control of the operation of each of the devices based on the generated data file; and
    wherein the data file also defines an alarming operation for reporting the completion of the control of the operation of each of the devices; and a control of another device related to the operation of each of the devices.

11. The substrate processing method of claim 10, wherein the storage step further includes another storage step for storing the data file defining the control of the operation of each of the devices corresponding to the macro files.

12. The substrate processing method of claim 10, wherein the data file defines an interlock for the operation of each of the devices.

13. A program stored on a storage medium, for executing a substrate processing method for performing a processing including a plurality of processes on a substrate by operating a multiplicity of devices incorporated in a substrate processing apparatus,
    wherein the program comprises:
    a storage module for storing therein commands describing operations of the devices;
    a generation module for generating macro files, each of which corresponds to each of the processes, from the stored commands and creating a process sequence macro by combining the generated macro files; and
    an execution module for executing the process sequence macro;
    wherein the storage module further stores a data file defining a control of a operation of each of the devices corresponding to the macro files; the generation module generates the data file; and the execution module executes the control of the operation of each of the devices based on the generated data file; and wherein the data file defines an alarming operation for reporting the completion of the control of the operation of each of the devices; and a control of another devices related to the operation of each of the devices.

14. The program of claim 13, wherein the commands are converted into hard codes.

15. The program of claim 13 or 14, wherein the program further operates another storage module for storing the generated macro files on the computer.

16. The program of claim 13, wherein the program further operates a transmission module for sending the macro files to an external device and a reception module for receiving the macro files from the external device on the computer.

17. The program of claim 16, wherein the program further operates a verification module for examining whether a sequence of each of the macro files is normal.

18. The program of claim 13, wherein the storage module incorporates still another storage unit for storing the data file defining the control of the operation of each of the devices corresponding to the macro files.

19. The program of claim 13, wherein the data file defines an interlock for the operation of each of the devices.

* * * * *